US010414364B2

(12) United States Patent
Kaneko et al.

(10) Patent No.: US 10,414,364 B2
(45) Date of Patent: Sep. 17, 2019

(54) BUMPER REINFORCEMENT FOR VEHICLE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP); AISIN KEIKINZOKU KABUSHIKI KAISHA, Imizu-shi, Toyama-ken (JP)

(72) Inventors: Takanobu Kaneko, Nontong (CN); Hiroharu Iizuka, Aichi-gun (JP); Kiyoichi Kita, Okazaki (JP); Jun Shobo, Anjo (JP); Kyosuke Matsui, Anjo (JP); Tamaki Obayashi, Toyama (JP); Hirofumi Shibata, Kariya (JP)

(73) Assignees: Aisin Seiki Kabushiki Kaisha, Kariya-shi, Aichi-ken (JP); Toyota Jidosha Kabushiki Kaisha, Toyota-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 49 days.

(21) Appl. No.: 15/646,363

(22) Filed: Jul. 11, 2017

(65) Prior Publication Data

US 2018/0015895 A1 Jan. 18, 2018

(30) Foreign Application Priority Data

Jul. 12, 2016 (JP) .................................. 2016-137261

(51) Int. Cl.
*B60R 19/24* (2006.01)
*B60R 19/18* (2006.01)
(Continued)

(52) U.S. Cl.
CPC ............ *B60R 19/24* (2013.01); *B60R 19/023* (2013.01); *B60R 19/04* (2013.01); *B60R 19/18* (2013.01); *B60R 2019/182* (2013.01)

(58) Field of Classification Search
CPC ....... B60R 19/24; B60R 19/023; B60R 19/18; B60R 19/04; B60R 2019/182
(Continued)

(56) References Cited

U.S. PATENT DOCUMENTS

| 6,695,368 B1 * | 2/2004 | Weykamp ............... B60R 19/26 293/122 |
| 2012/0025545 A1 | 2/2012 | Haneda et al. |
| 2013/0113224 A1 * | 5/2013 | Tsuchida ................. B60R 19/18 293/102 |

FOREIGN PATENT DOCUMENTS

| JP | 2005-088740 A | 4/2005 |
| JP | 2009-083529 A | 4/2009 |

(Continued)

OTHER PUBLICATIONS

Office Action issued in JP2016-137261 dated Jun. 13, 2018.

*Primary Examiner* — Joseph D. Pape
*Assistant Examiner* — Dana D Ivey
(74) *Attorney, Agent, or Firm* — Finnegan, Henderson, Farabow, Garrett & Dunner, LLP

(57) ABSTRACT

A bumper reinforcement includes a body part extending in a vehicle width direction, and a terminal part, which extends in the vehicle width direction, is attached to an end part of the body part in a longitudinal direction, and is joined to the body part in a state of being superimposed on the end part of the body part. Rigidity of the end part of the body part in the longitudinal direction is lower than rigidity of a center part of the body part in the longitudinal direction.

3 Claims, 12 Drawing Sheets

(51) Int. Cl.
  *B60R 19/02* (2006.01)
  *B60R 19/04* (2006.01)
(58) Field of Classification Search
  USPC .......................................................... 293/102
  See application file for complete search history.

(56) References Cited

FOREIGN PATENT DOCUMENTS

| | | |
|---|---|---|
| JP | 2010-260499 | 11/2010 |
| JP | 2011-245910 A | 12/2011 |
| JP | 2012-030722 A | 2/2012 |

\* cited by examiner

FRONT ←— VEHICLE FRONT-REAR DIRECTION —→ REAR

BUMPER REINFORCEMENT FOR VEHICLE

INCORPORATION BY REFERENCE

The disclosure of Japanese Patent Application No. 20167137261 filed on Jul. 12, 2016 including the specification, drawings and abstract is incorporated herein by reference in its entirety.

BACKGROUND

1. Technical Field

The disclosure relates to a bumper reinforcement for a vehicle.

2. Description of Related Art

As described in Japanese Patent Application Publication No. 2010-260499 (JP 2010-260499 A) below, a bumper reinforcement for a vehicle is disclosed, which absorbs an impact when an object collides with a front end (or a rear end) of the vehicle while the vehicle is running. The bumper reinforcement for a vehicle has a body part extending in a vehicle width direction, and terminal parts that are assembled to end parts of the body part in the longitudinal direction (left and right end parts), respectively. The terminal parts are fixed to the body part in a state of being superimposed on the end parts of the body part, respectively.

SUMMARY

The body part of the foregoing bumper reinforcement for a vehicle is formed by extruding an aluminum alloy material. This means that a sectional shape of the body part, which is perpendicular to the longitudinal direction of the body part, is constant regardless of a position of the section. The terminal parts are superimposed on the end parts of the body part, respectively. Therefore, a thickness of a portion where the terminal part and the end part of the body part overlap each other is larger than a thickness of the remaining portion (for example, a center part of the body part in the longitudinal direction). Therefore, in the bumper reinforcement for a vehicle, the portions where the body part and the terminal part overlap each other have larger rigidity than that of the remaining portion. In the case where the portions of the bumper reinforcement for a vehicle, in which the body part and the terminal part overlap each other, has higher rigidity than that of the remaining portion, when an impact is applied to the bumper reinforcement for a vehicle, the bumper reinforcement for a vehicle fractures at its end part in the vehicle width direction in an initial stage of a deformation process of the bumper reinforcement for a vehicle. After that, almost no impact is absorbed.

The disclosure provides a bumper reinforcement for a vehicle, in which a difference in rigidity in respective parts is reduced. In the description of each component of the disclosure explained below, reference numerals of corresponding parts of the embodiment are put in parentheses in order to facilitate understanding of the disclosure. However, the components of the disclosure should not be exclusively interpreted as the corresponding parts denoted by the reference numerals of the embodiment.

A bumper reinforcement for a vehicle according to the first aspect of the disclosure includes a body part extending in a vehicle width direction, and a terminal part, which extends in the vehicle width direction, is attached to an end part of the body part in a longitudinal direction, and is joined to the body part in a state of being superimposed on the end part of the body part. Rigidity of the end part of the body part in the longitudinal direction is lower than rigidity of a center part of the body part in the longitudinal direction.

In the above aspect, a section of the end part of the body part in the longitudinal direction, which is a section perpendicular to the longitudinal direction of the body part, has a smaller area than a area of a section of the center part of the body part in the longitudinal direction, which is a section perpendicular to the longitudinal direction of the body part.

In the above structure, in the end part of the body part in the longitudinal direction, the area of the section perpendicular to the longitudinal direction of the body part may become gradually smaller from the center part of the body part to one end side of the body part.

In the above structure, the body part may include a first wall part, in which the vehicle width direction is a longitudinal direction of the first wall part, and a vehicle height direction is a width direction of the first wall part, a second wall part, in which the vehicle width direction is a longitudinal direction of the second wall part, and a vehicle front-rear direction is a width direction of the second wall part, the second wall part extending from an upper end part of the first wall part to a cabin side, a third wall part, in which the vehicle width direction is a longitudinal direction of the third wall part, and the vehicle front-rear direction is a width direction of the third wall part, the third wall part extending from a lower end part of the first wall part towards the cabin side, a fourth wall part, in which the vehicle width direction is a longitudinal direction of the fourth wall part, and the vehicle height direction is a width direction of the fourth wall part, the fourth wall part extending downwardly from an end part of the second wall part on the cabin side, and a fifth wall part, in which the vehicle width direction is a longitudinal direction of the fifth wall part, and the vehicle height direction is a width direction of the fifth wall part, the fifth wall part extending upwardly from an end part of the third wall part on the cabin side. Sections of end parts of the fourth wall part and the fifth wall part in the longitudinal direction, which are sections perpendicular to the longitudinal direction of the fourth wall part and the fifth wall part, have smaller areas than those of sections of center parts of the fourth wall part and the fifth wall part in the longitudinal direction, which are sections perpendicular to the longitudinal direction of the fourth wall part and the fifth wall part.

In the bumper reinforcement for a vehicle according to the disclosure, rigidity of the end part of the body part is set to be lower than rigidity of the center part of the body part. Therefore, in the bumper reinforcement for a vehicle according to the disclosure, a portion where the body part and the terminal part are superimposed on each other has lower rigidity than that of a conventional bumper reinforcement for a vehicle, in which rigidity of the end part of the body part is equal to that of the center part of the body part. This means that a difference in rigidity in respective parts of the bumper reinforcement for a vehicle is reduced compared to the conventional bumper reinforcement for a vehicle. Thus, according to the disclosure, in an initial stage of a deforming process of the bumper reinforcement for a vehicle at the time of collision, fracture is less likely to happen in the end part of the bumper reinforcement for a vehicle in the vehicle width direction, thereby making it possible to absorb an impact efficiently.

A bumper reinforcement for a vehicle according to the second aspect of the disclosure includes a body part extending in a vehicle width direction, and a terminal part, which extends in the vehicle width direction, and is attached to an end part of the body part in a longitudinal direction. The terminal part is joined to the body part in a state where one end part of the terminal part is superimposed on the end part of the body part, and the other end part of the terminal part projects from the body part. The one end part of the terminal part has lower rigidity than that of the other end part of the terminal part. According to this aspect, similar effects are obtained to those of the bumper reinforcement for a vehicle, in which rigidity of the end part of the body part is lower than that of the center part.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
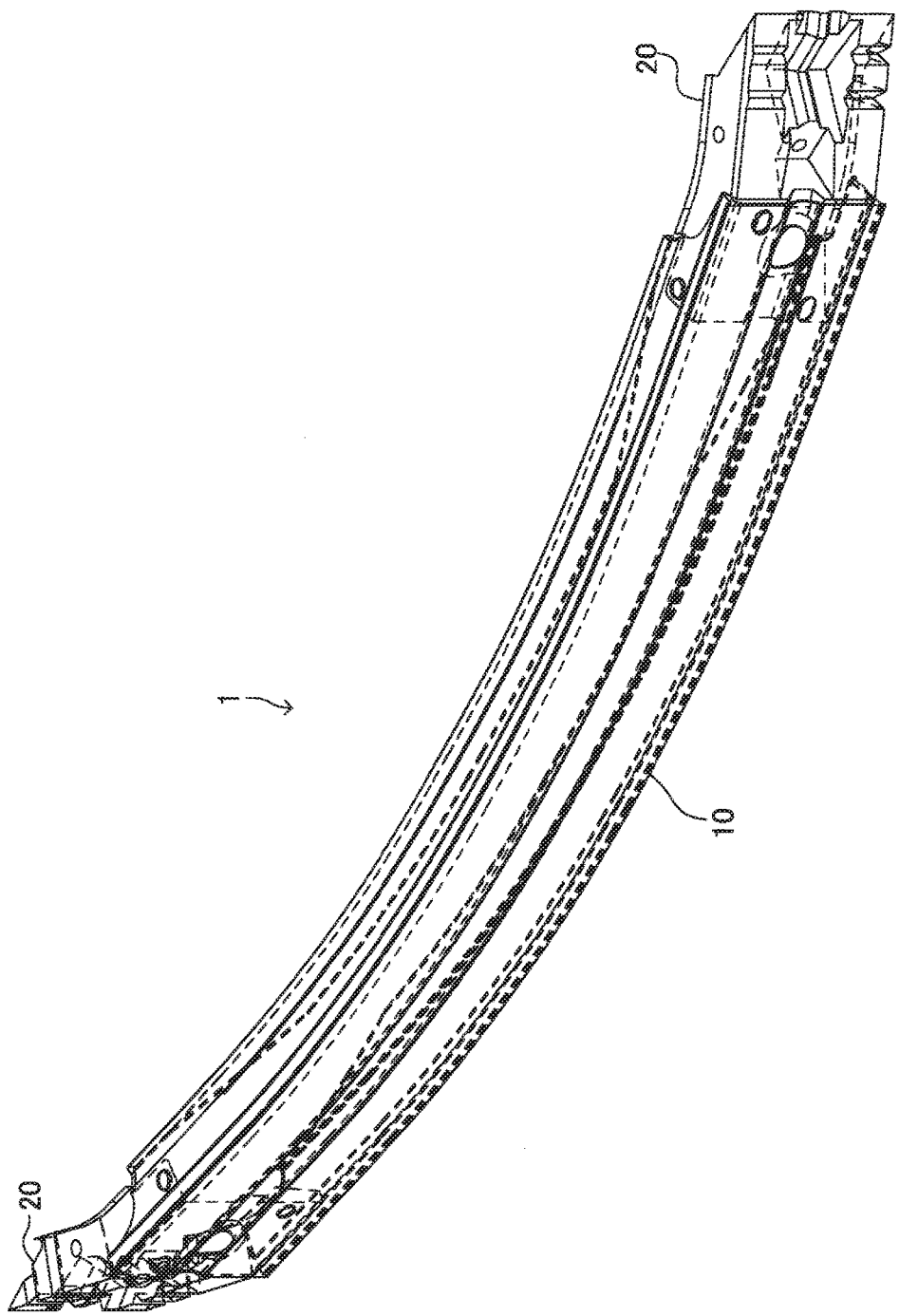
FIG. 1 a perspective view of a bumper reinforcement for a vehicle according to the disclosure.
Figure 2:
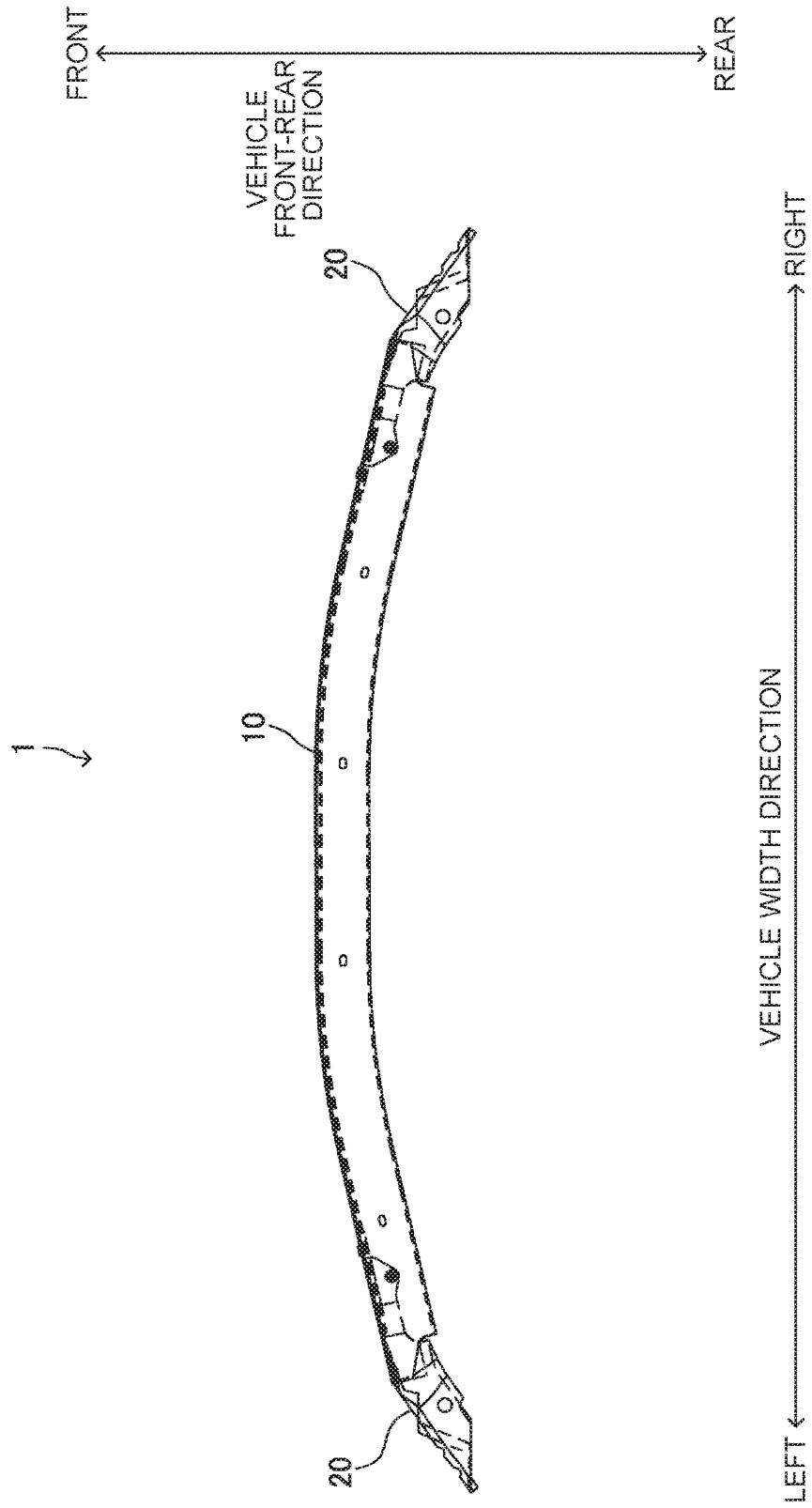
FIG. 2 is a plan view of the bumper reinforcement for a vehicle shown in FIG. 1.
Figure 3:
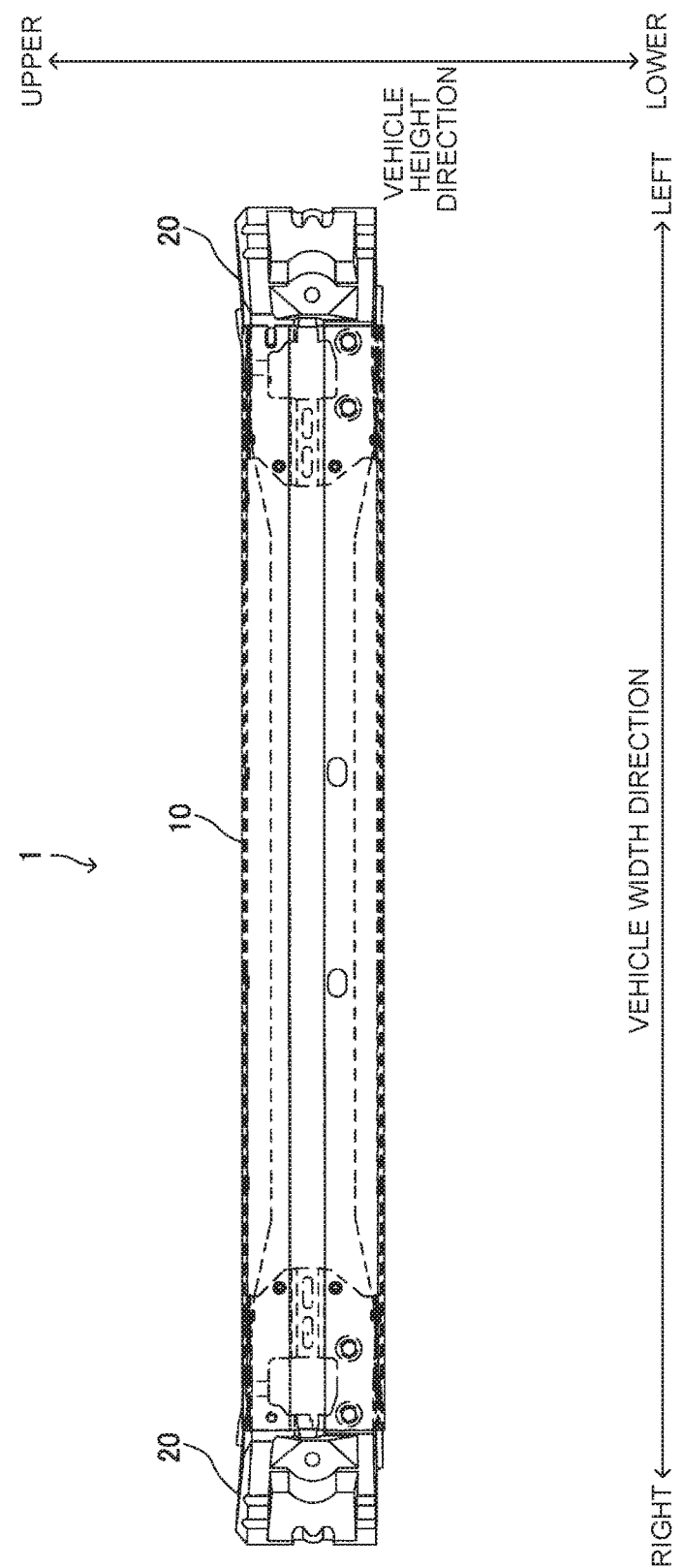
FIG. 3 is front view of the bumper reinforcement for a vehicle shown in FIG. 1.

A bumper reinforcement for a vehicle 1 according to an embodiment of the disclosure is explained. As shown in FIG. 1 to FIG. 3, the bumper reinforcement for a vehicle 1 has a body part 10 and terminal parts 20, 20.

Figure 4:
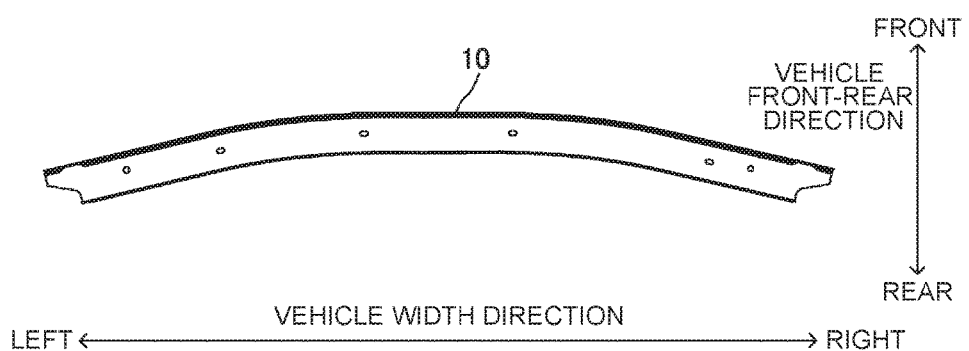
FIG. 4 is a plan view of a body part.
Figure 5:
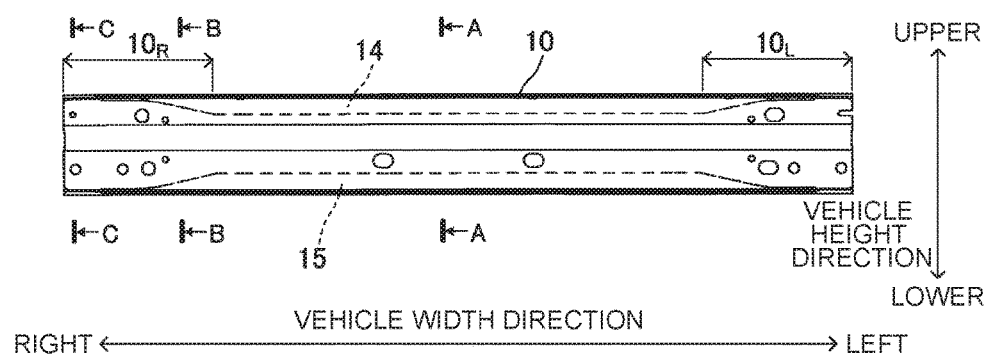
FIG. 5 is a front view of the body part
Figure 6:
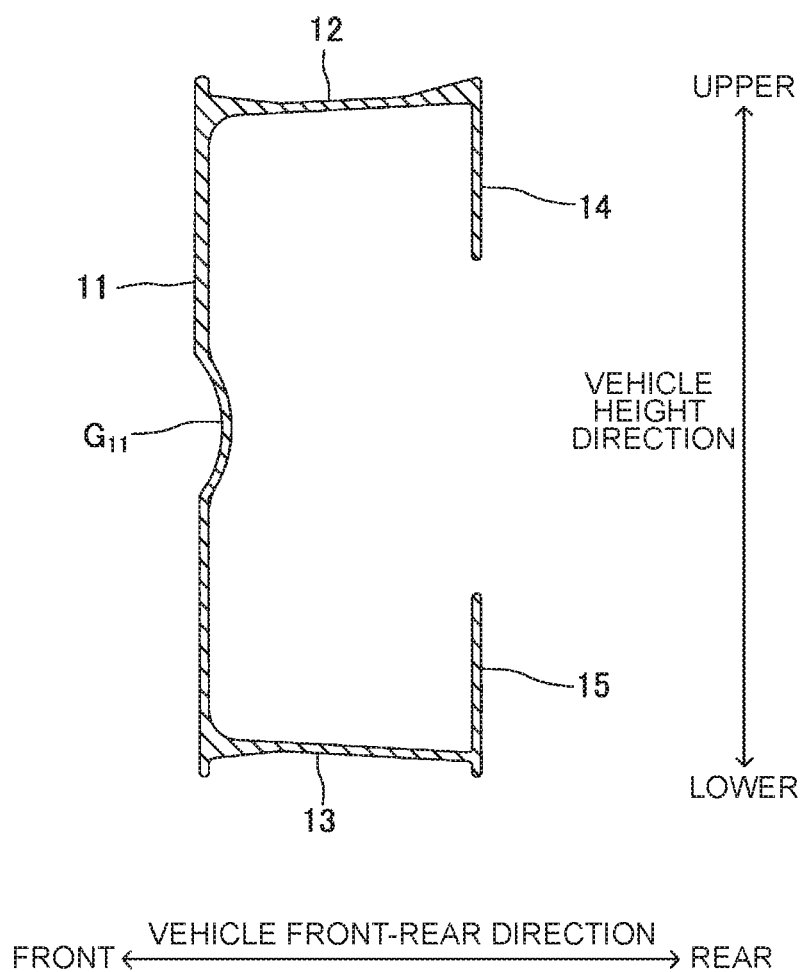
FIG. 6 is a sectional view taken along the line A-A in FIG. 5.
Figure 7:
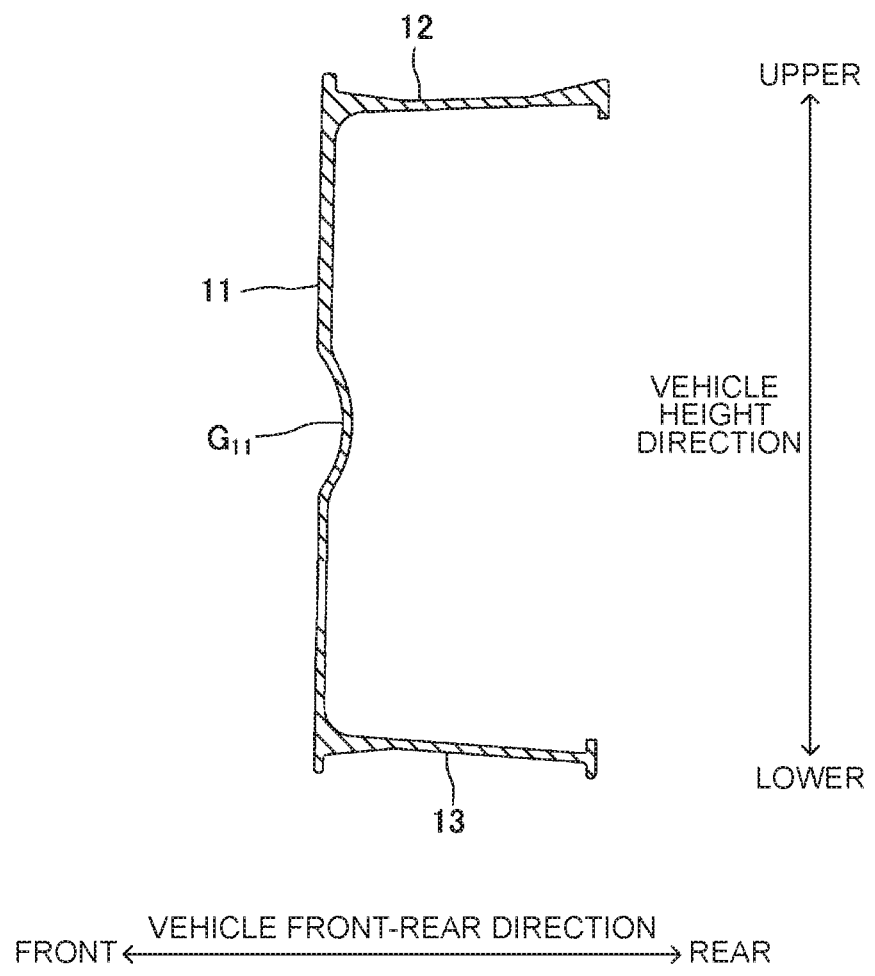
FIG. 7 is a sectional view taken along the line B-B in FIG. 5.
Figure 8:
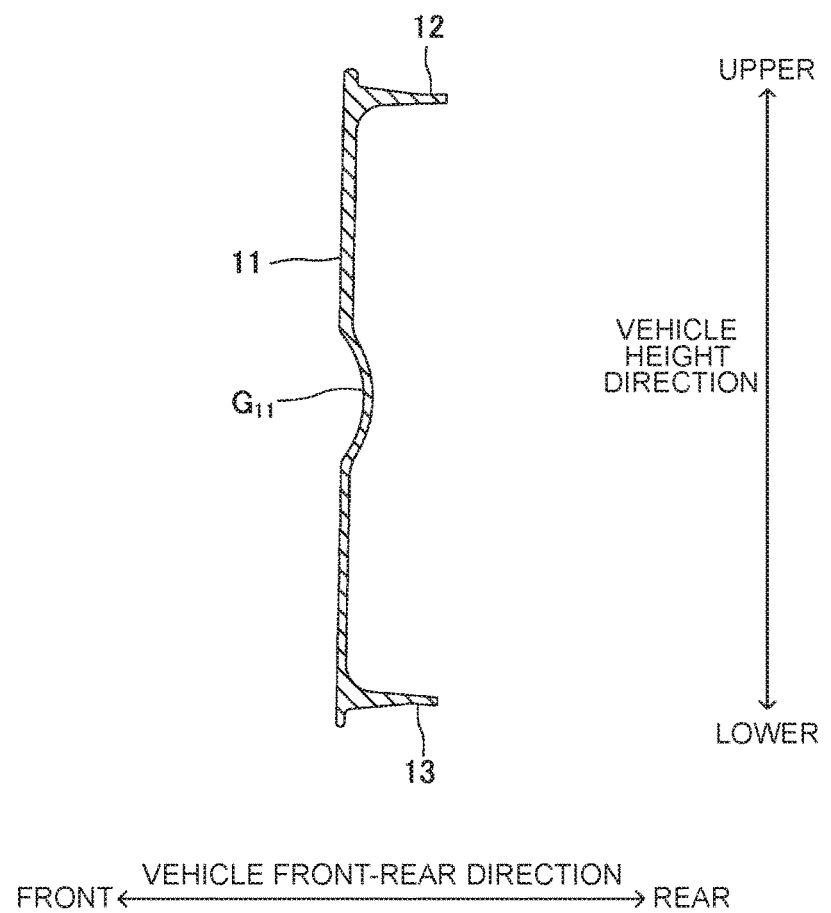
FIG. 8 is a sectional view taken along the line C-C in FIG. 5.

Next, a structure of the body part 10 is explained. As shown in FIG. 4 and FIG. 5, the body part 10 extends in a vehicle width direction. In a plan view, a center part of the body part 10 in the vehicle width direction is curved into an arch shape (see FIG. 4). This means that outer parts of the body part 10 in the vehicle width direction are positioned to a slightly rear side compared to an inner part of the body part 10 in the vehicle width direction. A curvature of the body part 10 is decided depending on a design of a front end part of a vehicle (a shape of a bumper cover). As shown in FIG. 6 to FIG. 8, the body part 10 includes a front wall part 11, an upper wall part 12, a lower wall part 13, an upper rear wall part 14, and a lower rear wall part 15. The front wall part 11 is formed into a plate shape in which the vehicle width direction is the longitudinal direction, and a vehicle height direction is the width direction. In a center part of a front surface of the front wall part 11 in the vehicle height direction, a groove part $G_{11}$ is formed, which extends in the vehicle width direction. The upper wall part 12 and the lower wall part 13 are formed into a plate shape, in which the vehicle width direction is the longitudinal direction, and a vehicle front-rear direction is the width direction. The upper wall part 12 extends from an upper end part of the front wall part 11 to the rear side (a cabin side). The lower wall part 13 extends from a lower end part of the front wall part 11 to the rear side (the cabin side). The upper rear wall part 14 and the lower rear wall part 15 are formed into a plate shape, in which the vehicle width direction is the longitudinal direction, and the vehicle height direction is the width direction. This means that the upper rear wall part 14 and the lower rear wall part 15 are formed into a plate shape that is generally parallel to the front wall part 11. The upper rear wall part 14 extends downwardly from a rear end of the upper wall part 12. The lower rear wall part 15 extends upwardly from a rear end of the lower wall part 13. A lower end surface of the upper rear wall part 14 and an upper end surface of the lower rear wall part 15 face each other. This means that the body part 10 is open on the rear side.

In a right end part $10_R$ of the body part 10, widths (dimensions in an upper-lower direction) of the upper rear wall part 14 and the lower rear wall part 15 become gradually smaller from the center part of the body part 10 towards a right end of the body part 10 (see FIG. 5 to FIG. 8). Also, widths (dimensions in the front-rear direction) of right side parts of the upper wall part 12 and the lower wall part 13 in the right end part $10_R$ are smaller than widths (dimensions in the front-rear direction) of left side parts of the upper wall part 12 and the lower wall part 13 in the right end part $10_R$. Therefore, in the right end part $10_R$ of the body part 10, an area of a section perpendicular to the longitudinal direction of the body part 10 becomes gradually smaller from the center part of the body part 10 towards the right end of the body part 10. Further, in a left end part $10_L$ of the body part 10, widths (dimensions in the upper-lower direction) of the upper rear wall part 14 and the lower rear wall part 15 become gradually smaller from the center part of the body part 10 towards a left end of the body part 10. Further, widths (dimensions in the front-rear direction) of left side parts of the upper wall part 12 and the lower wall part 13 in the left end part $10_L$ are smaller than widths (dimensions in the front-rear direction) of right side parts of the upper wall part 12 and the lower wall part 13 in the left end part $10_L$. Therefore, in the left end part $10_L$ of the body part 10, an area of a section perpendicular to the longitudinal direction of the body part 10 becomes gradually smaller from the center part of the body part 10 towards the left end of the body part 10. This means that sections of the end parts of the body part 10 in the longitudinal direction, which are perpendicular to the longitudinal direction of the body part 10, have smaller areas (areas with diagonal lines in FIG. 7 and FIG. 8) compared to an area of a section of the center part of the body part 10 in the longitudinal direction, the section being perpendicular to the longitudinal direction of the body part 10 (an area with diagonal lines in FIG. 6).

In the body part 10, various through-holes (for example, holes in which fastening members (rivet, bolt, etc.) for fastening the terminal parts 20 to the body part 10 are inserted) are also provided.

Figure 9:
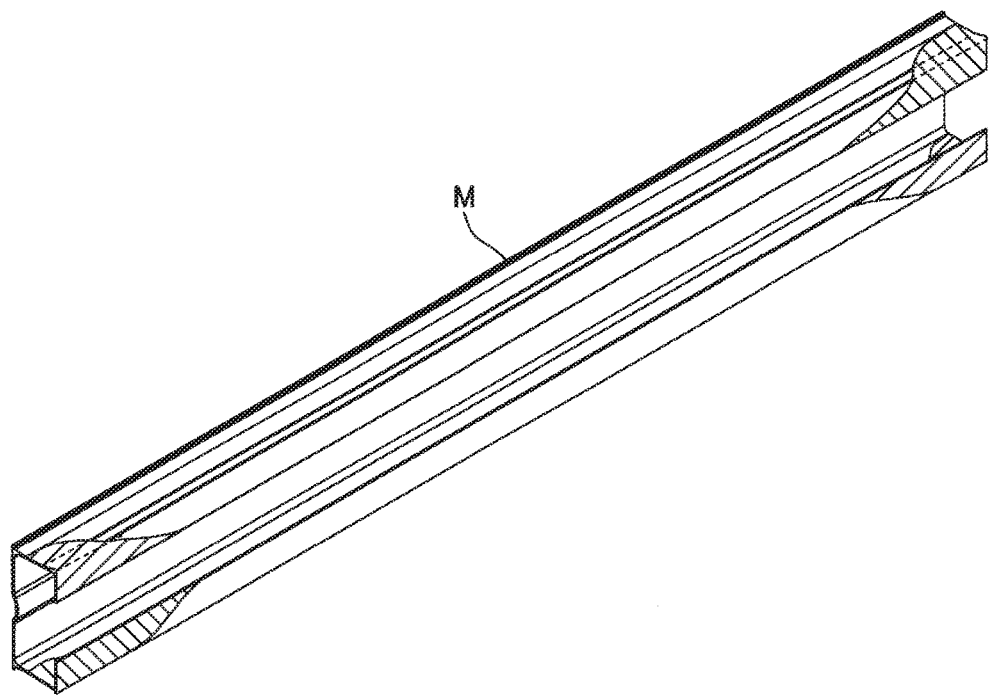
FIG. 9 is a perspective view of an intermediate molded body.

The body part 10 is formed as follows. First of all, extrusion of a metallic material (for example, an aluminum alloy material) is carried out, and a linear-shaped intermediate molded body M as shown in FIG. 9 is formed. An extrusion direction of the metallic material corresponds to the vehicle width direction. This means that the intermediate molded body M extends in the vehicle width direction. A section of the intermediate molded body M perpendicular to its longitudinal direction has a shape similar to that of the section shown in FIG. 6. Thus, the intermediate molded body M has wall parts that correspond to the front wall part 11, the upper wall part 12, the lower wall part 13, the upper rear wall part 14, and the lower rear wall part 15, respectively. Next, of the wall parts of the intermediate molded body M, right end parts and left end parts (parts with diagonal lines in FIG. 9) of the wall parts corresponding to the upper wall part 12, the lower wall part 13, the upper rear wall part 14, and the lower rear wall part 15 are trimmed. Next, the various through-holes are formed in the wall parts of the intermediate molded body M. Then, a center part of the intermediate molded body M in the vehicle width direction is bent into an arch shape. The body part 10 is formed as explained above.

Next, a structure of the terminal part 20 is explained. The terminal part 20 assembled to the left end part of the body part 10, and the terminal part 20 assembled to the right end part of the body part 10 are the same members. This means that the terminal parts 20 have shapes that are vertically symmetrical to each other, and may be assembled to any of the left end part and the right end part of the body part 10.

Figure 10:
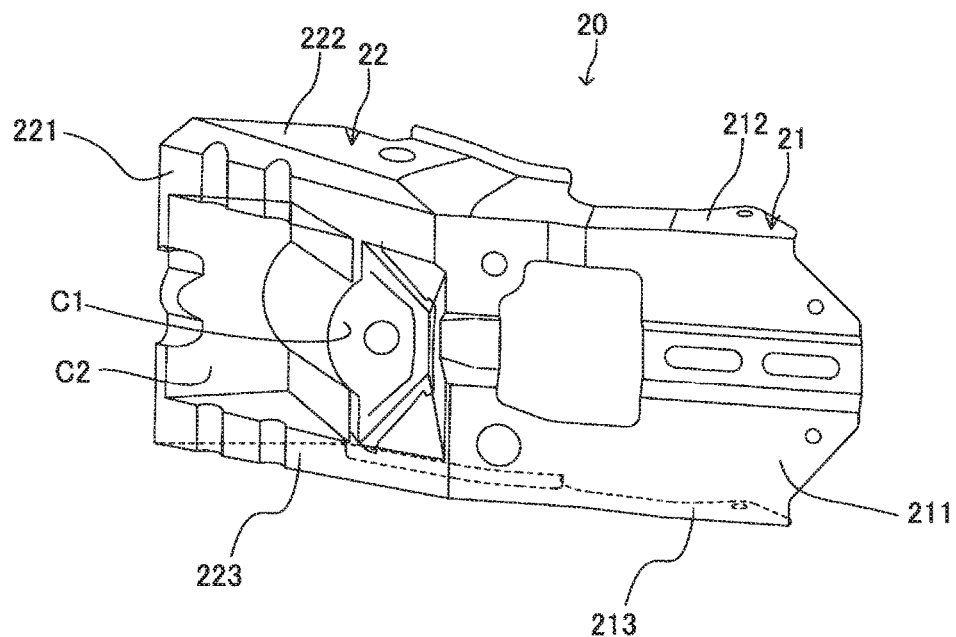
FIG. 10 is a perspective view of a terminal part.
Figure 11:
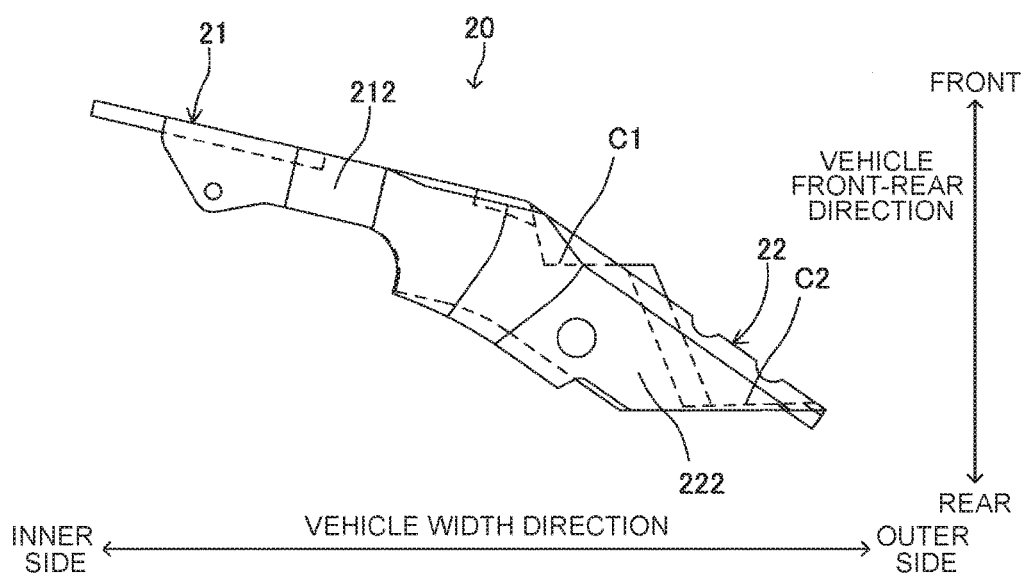
FIG. 11 is a plane view of the terminal part.
Figure 12:
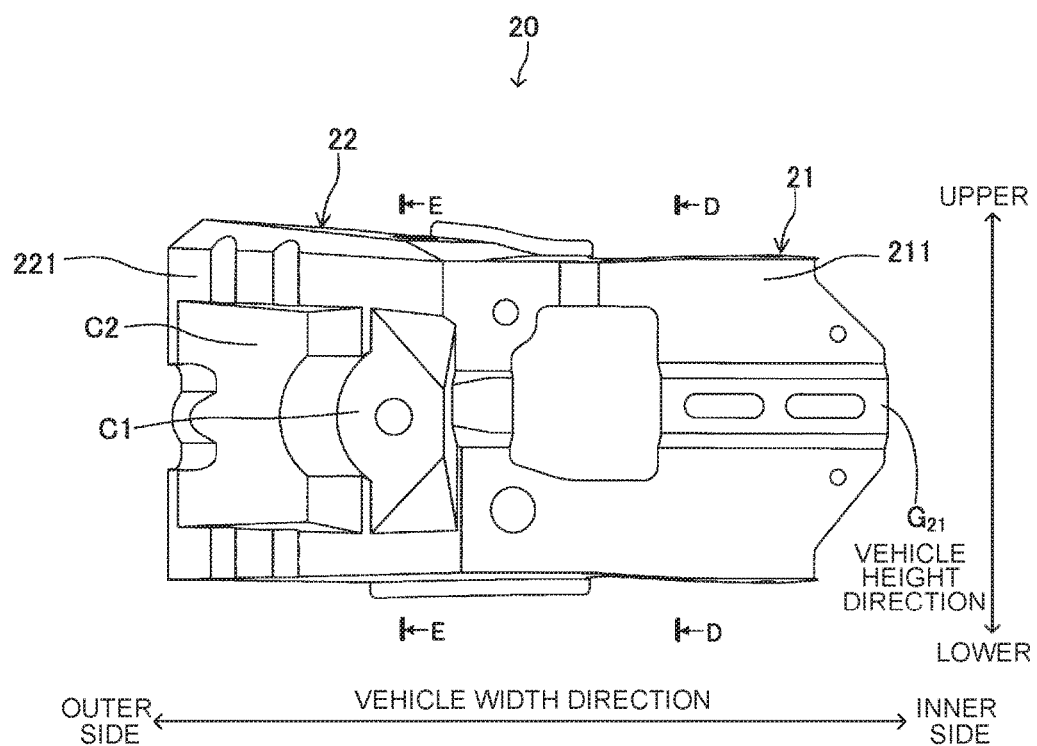
FIG. 12 is a front view of the terminal part.

As shown in FIG. 10 to FIG. 12, each of the terminal parts 20 has a distal end part 21 and a projecting part 22. The distal end part 21 is assembled to the body part 10 in a state of being superimposed on the end part of the body part 10. The projecting part 22 is continuous from the distal end part 21, projects form the end part of the body part 10 in a state where the terminal part 20 is assembled to the body part 10, and extends to a diagonally rear side (see FIG. 1 to FIG. 3). An extending direction of the distal end part 21 coincides with an extending direction of the end part of the body part 10, but an extending direction of the projecting part 22 is inclined with respect to the extending direction of the body part 10. In other words, as shown in FIG. 10, the terminal part 20 is curved in its plan view. A curvature near a boundary part of the distal end part 21 and the projecting part 22 is larger than a curvature of the body part 10.

The distal end part 21 has a plate-shaped front wall part 211 that is generally parallel to the front wall part 11 of the body part 10. Further, the distal end part 21 has plate-shaped upper wall part 212 and lower wall part 213 that are generally parallel to the upper wall part 12 and the lower wall part 13 of the body part 10. A front end of the upper wall part 212 is connected with an upper end of the front wall part 211, and a front end of the lower wall part 213 is connected with a lower end of the front wall part 211. A dimension of the distal end part 21 in the vehicle height direction is slightly smaller than a distance between a lower surface of the upper wall part 12 and an upper surface of lower wall part 13 of the body part 10.

In a center part of a front surface of the front wall part 211 in the vehicle height direction, a groove part $G_{21}$ extending in the vehicle width direction is formed. The groove part $G_{21}$ is formed so as to be slightly smaller than the groove part $G_{11}$, and is thus able to be superimposed on the groove part $G_{11}$. Further, a center part of the front wall part 211 in the vehicle height direction projects further to the inner side in the vehicle width direction from inner end parts of an upper end part and a lower end part of the front wall part 211 in the vehicle width direction.

The projecting part 22 has a plate-shaped front wall part 221 extending from an outer end part of the front wall part 211 of the distal end part 21 in the vehicle width direction.

The projecting part 22 has plate-shaped upper wall part 222 and lower wall part 223 that are generally parallel to the upper wall part 12 and the lower wall part 13 of the body part 10. The upper wall part 222 and the lower wall part 223 extend from outer end parts of the upper wall part 212 and the lower wall part 213 of the distal end part 21 in the vehicle width direction, respectively. Further, a front end of the upper wall part 222 is connected with an upper end of the front wall part 221, and a front end of the lower wall part 223 is connected with a lower end of the front wall part 221.

In a center part of a front surface of the front wall part 221 in the vehicle height direction, a recessed part C1 and a recessed part C2 for formed. The recessed parts C1, C2 are provided to be in line with each other in the vehicle width direction. A section of the recessed part C1 and the recessed part C2, which is perpendicular to the vehicle height direction, has a step shape (see FIG. 11). Further, widths (dimensions in the front-rear direction) of the upper wall part 212 and the lower wall part 213 are smaller than widths (dimensions in the front-rear direction) of the upper wall part 222 and the lower wall part 223. This means that a section of the distal end part 21, which is perpendicular to the longitudinal direction has a smaller area than that of a section of the projecting part 22, which is perpendicular to the longitudinal direction.

Further, various through-holes (for example, holes in which fastening members (rivet, bolt, etc.) for fastening the terminal parts 20 to the body part 10 are inserted) are formed in the terminal parts 20.

Each of the terminal parts 20 is formed integrally by pressing a metallic plate.

Figure 13:
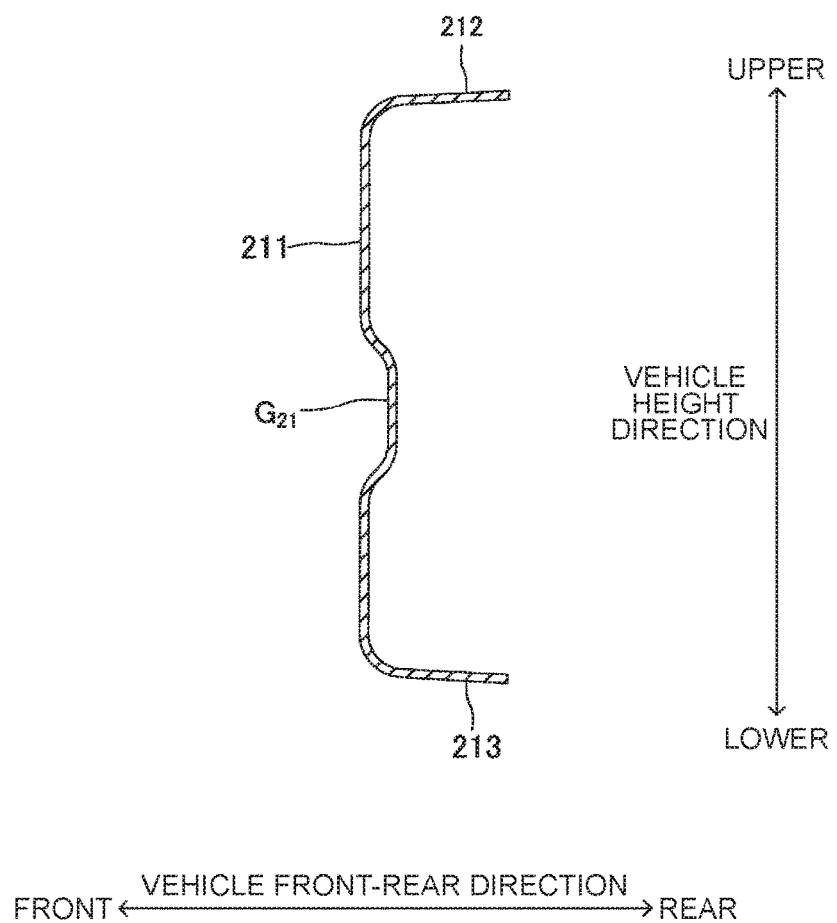
FIG. 13 is a sectional view taken along the line D-D in FIG. 12.
Figure 14:
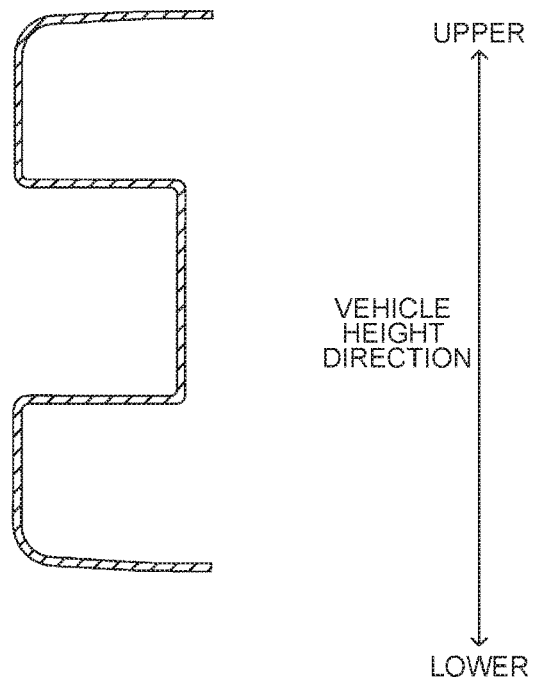
FIG. 14 is a sectional view taken along the line E-E in FIG. 12.

As stated above, the sections of the right end part $10_R$ and the left end part $10_L$ of the body part 10 (FIG. 7 and FIG. 8) have smaller areas than that of the section of the center part (FIG. 6) of the body part 10 in the vehicle width direction. Therefore, rigidity of left and right end parts of the body part 10 is slightly lower than rigidity of the center part of the body part 10 in the vehicle width direction. Meanwhile, the section of the distal end part 21 of the terminal part 20 (FIG. 13) has a smaller area than that of the section of the projecting part 22 (FIG. 14). Therefore, rigidity of the distal end part 21 is slightly lower than that of the projecting part 22. The body part 10 and the terminal parts 20, 20 are fastened by using fastening members (rivet, bolt, etc.) in the state where the right end part $10_R$ and the left end part $10_L$ of the body part 10 (in other words, parts with lower rigidity than that of the center part of the body part 10) are superimposed on the distal end parts 21 of the terminal parts 20 (in other words, parts with lower rigidity than that of the projecting parts 22), respectively. Because of this, compared to a conventional bumper reinforcement for a vehicle, a difference in rigidity in respective parts (in other words, a difference in rigidity between the part where the body part 10 and the terminal part 20 are superimposed on each other, and the remaining part) is reduced. Thus, in an initial stage of a deforming process of the bumper reinforcement for a vehicle 1 after collision, fracture is less likely to happen in the end part of the bumper reinforcement for a vehicle 1 in the vehicle width direction, thereby making it possible to absorb an impact efficiently.

Further, carrying out the disclosure is not limited to the foregoing embodiment; various changes may be made without departing from the gist of the disclosure.

Figure 15:
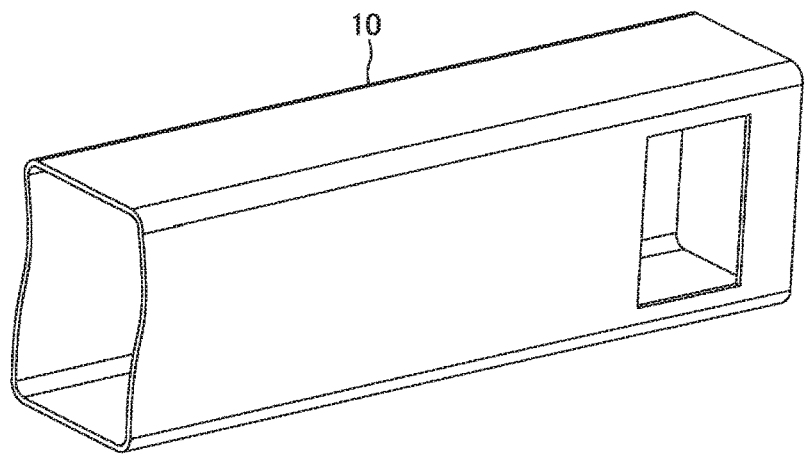
FIG. 15 is a perspective view of an end part of a body part according to a modification of the disclosure.

For example, in the foregoing bumper reinforcement for a vehicle 1, rigidity of the left and right end parts the body part 10 is set to be slightly lower than rigidity of the center part of the body part 10 in the vehicle width direction, and rigidity of the distal end part 21 is set to be slightly lower than rigidity of the projecting part 22. Instead, the structure of the body part 10 may be similar to that in the foregoing embodiment, and rigidity of the distal end part 21 and rigidity of the projecting part 22 of the terminal part 20 may be approximately equal to each other. For example, the recessed parts C1, C2 may be omitted. Further, in the foregoing embodiment, among the wall parts of the intermediate molded body M, right end parts and left end parts of the wall parts corresponding to the upper wall part 12, the lower wall part 13, the upper rear wall part 14, and the lower rear wall part 15 are trimmed. However, for example, among the wall parts of the intermediate molded body M, the wall part corresponding to the front wall part 11 may be trimmed. This means that, the intermediate molded body M only needs to be processed so that rigidity the right end part $10_R$ and the left end part $10_L$ of the body part 10 becomes smaller than rigidity of the center part of the body part 10. Also, the shape of the body part 10 is not limited to that in the foregoing embodiment. For example, as shown in FIG. 15, a rectangular-cylindrical intermediate molded body M is formed in advance, and openings are made in left and right end parts of the intermediate molded body M. The resultant member may be used as the body part 10.

What is claimed is:

1. A bumper reinforcement for a vehicle, comprising:
    a body part extending in a vehicle width direction; and
    a terminal part, which extends in the vehicle width direction, is attached to an end part of the body part in a longitudinal direction, and is joined to the body part in a state of on overlapping the end part of the body part, wherein
    rigidity of the end part of the body part in the longitudinal direction is lower than rigidity of a center part of the body part in the longitudinal direction,
    a section of the end part of the body part in the longitudinal direction, which is a section perpendicular to the longitudinal direction of the body part, has a smaller area than an area of a section of the center part of the body part in the longitudinal direction, which is a section perpendicular to the longitudinal direction of the body part,
    the body part includes a first wall part, in which the vehicle width direction is a longitudinal direction of the first wall part, and a vehicle height direction is a width direction of the first wall part, a second wall part, in which the vehicle width direction is a longitudinal direction of the second wall part, and a vehicle front-rear direction is a width direction of the second wall part, the second wall part extending from an upper end part of the first wall part to a cabin side, a third wall part, in which the vehicle width direction is a longitudinal direction of the third wall part, and the vehicle front-rear direction is a width direction of the third wall part, the third wall part extending from a lower end part of the first wall part towards the cabin side, a fourth wall part, in which the vehicle width direction is a longitudinal direction of the fourth wall part, and the vehicle height direction is a width direction of the fourth wall part, the fourth wall part extending downwardly from an end part of the second wall part on the cabin side, and a fifth wall part, in which the vehicle width direction is a longitudinal direction of the fifth wall part, and the vehicle height direction is a width direction of the fifth wall part, the fifth wall part extending upwardly from an end part of the third wall part on the cabin side, and
    sections of end parts of the fourth wall part and the fifth wall part in the longitudinal direction, which are sections perpendicular to the longitudinal direction of the fourth wall part and the fifth wall part, have smaller areas than those of sections of center parts of the fourth wall part and the fifth wall part in the longitudinal direction, which are sections perpendicular to the longitudinal direction of the fourth wall part and the fifth wall part.

2. The bumper reinforcement according to claim 1, wherein,
    in the end part of the body part in the longitudinal direction, the area of the section perpendicular to the longitudinal direction of the body part becomes gradually smaller from the center part of the body part to one end side of the body part.

3. The bumper reinforcement according to claim 1, wherein
    the terminal part is joined to the body part in a state where one end part of the terminal part overlaps the end part of the body part, and the other end part of the terminal part projects from the body part, and
    the one end part of the terminal part has lower rigidity than that of the other end part of the terminal part.

* * * * *